March 19, 1929.  W. A. JESSUP  1,706,297

SPRING WHEEL

Filed May 17, 1926

WITNESSES.

INVENTOR.
Wardlow A. Jessup
BY
ATTORNEY.

Patented Mar. 19, 1929.

1,706,297

UNITED STATES PATENT OFFICE.

WARDLOW A. JESSUP, OF MILWAUKEE, WISCONSIN.

SPRING WHEEL.

Application filed May 17, 1926. Serial No. 109,633.

The invention relates to spring wheels.

The object of the invention is to provide a spring wheel including spokes having resilient arched portions arranged to afford endwise resiliency for the spokes but to prevent any substantial lateral displacement, especially out of the plane of the wheel.

The invention further consists in the several features hereinafter set forth and more particularly defined by the annexed claims.

In the accompanying drawings, Fig. 1 is a side elevation of a spring wheel embodying the invention;

Fig. 2 is a transverse sectional view thereof taken on the line 2—2 of Fig. 1; and Fig. 3 is a similar view showing a modified form of wheel.

In these drawings, the numeral 10 designates a rim, preferably of T-shaped cross-section including an inwardly projecting flange 11, and 12 designates a hub having a radially projecting flange 13. The rim 10 and hub 12 are joined by radially-extending spokes 14 preferably of general cruciform cross-section and built up of complementary flat spring metal strips 15 and 16, each pair of strips 15 abutting flatwise and arranged at right angles to the other pair of strips 16. The ends of the spokes are forked to embrace the flanges 11 and 13 of the rim and hub, respectively, and are secured thereto by suitable fastening means such as rivets 17.

At an intermediate portion of each spoke 14, the strips 15 are bowed in opposite directions to form resilient arches 18 disposed in the plane of the wheel, and the strips 16 are likewise bowed at the same region of the spoke to form resilient arches 19 which lie in a plane at right angles to the arches 18, one set of arches being disposed within the other set. The spring strips 16 are provided with longitudinal centrally-located slots 20 admitting the strips 15, and the strips 15 and 16 are joined together adjacent the arches 18 and 19 by angle brackets 21. The resilient arches 18 and 19 are preferably though not necessarily semi-circular in shape and permit endwise contraction and expansion of the spoke.

In order to reinforce the rim against bending out of circular shape a reinforcing ring 22 is disposed about the hub 12 and is connected to the rim by rigid tubular spokes 23 arranged alternately with the spring spokes 14. The reinforcing ring 22 may be guided against lateral movement by its passage through slots 24 in the spring spokes 14, the slots being of sufficient width to permit the relative movement occasioned by the contraction and expansion of the spring spokes.

In the modified form of spoke shown in Fig. 3, the reinforcing ring 22 and spokes 23 are dispensed with, and the rim 10' is provided with an inwardly radially-projecting flange 11' of sufficient depth to afford the desired rigidity. The spring spokes 14' are secured as before to the flange 11' of the rim and to the flange 13' of the hub 12'. The arches 18' and 19' are arranged in the same relation that is present in the wheel of Figs. 1 and 2. In each case the rim of the wheel may be provided with the usual resilient tire 25.

The relation of the resilient arches in the spokes is such that any substantial lateral deflection of the spokes is avoided, thus preventing dishing or collapse of the wheel when used on a vehicle and permitting the application of driving torque without unduly distorting the wheel. When in use on a vehicle, the shocks caused by road irregularities are absorbed by the resilient arches of the spring spokes, the spokes at one side being longitudinally compressed while those at the opposite side are correspondingly expanded.

What I claim as new and desire to secure by Letters Patent is:

1. In a spring wheel, the combination, with a hub and a rim, of a plurality of resilient spokes connecting said hub and rim, each spoke having an intermediate resilient arched portion disposed in the plane of the wheel and a second resilient outwardly arched portion disposed transversely of said first-named arched portion and having terminal parts arranged within said first named arched portion.

2. In a spring wheel, the combination, with a hub and a rim, of a plurality of resilient spokes connecting said hub and rim, each spoke having intermediate resilient outwardly arched portions arranged one within the other but lying in different planes.

3. In a spring wheel, the combination, with a hub and a rim, of a plurality of resilient spokes connecting the said hub and rim, each spoke including a pair of resilient arched members bowed outwardly in opposite directions to lie substantially in the plane of the wheel, and a second pair of resilient arched members bowed outwardly in opposite directions to lie in a plane substantially at right angles to said first named pair of arched members, the inner and outer ends of said pairs of arched members being respectively adjacent.

4. In a spring wheel, the combination, with a hub and a rim, of a plurality of resilient spokes connecting the said hub and rim, each spoke including a pair of resilient arched members bowed outwardly in opposite directions to lie substantially in the plane of the wheel, and a second pair of resilient arched members bowed outwardly in opposite directions to lie in a plane substantially at right angles to said first named pair of arched members, the opposite terminal portions of one pair of said arched members lying within the terminal portions of the other pair of said arched members.

5. In a spring wheel, the combination, with a hub and a rim, of a plurality of resilient spokes connecting said hub and rim, each spoke comprising two pairs of resilient members having intermediate portions outwardly bowed in different directions, and terminal portions fixedly secured together to form a cruciform cross-section.

In testimony whereof, I affix my signature.

WARDLOW A. JESSUP.